Patented May 26, 1942

2,284,122

UNITED STATES PATENT OFFICE 2,284,122

PROCESS FOR PURIFYING SUGAR SOLUTIONS

Robert Boyd, Vancouver, British Columbia, Canada

No Drawing. Application May 24, 1940, Serial No. 337,077

4 Claims. (Cl. 127—55)

This invention relates to an improved process for purifying sugar solutions.

An object of the present invention is the provision of a process for obtaining an efficient purification of sugar solutions.

Another object is the provision of a process in which a flocculant precipitate containing impurities may readily be removed from a sugar solution.

Another object is the provision of a process for removing a high percentage of the impurities from a sugar solution.

A further object is the provision of a process for purifying sugar solutions in which a filter-aid is used, including means for efficiently recovering the filter-aid for further use.

At one time it was the custom to purify sugar solutions by producing in the solution a flocculent precipitate such as coagulated blood albumen or calcium phosphate. Precipitates of this nature enmesh many of the impurities present so that when the precipitate is removed by filtration or other means, a purified solution is obtained. The process is known as defecation. The practical disadvantage connected with the defecation process is the difficulty in removing the flocculent precipitate. Simple pressure filtration through a fabric is almost impossible owing to the gelatinous character of the solid matter which forms an impervious coating on the filter-fabric and bag-filtration is both expensive and inefficient.

Because of this disadvantage defecation has been largely discarded in the sugar industry and pressure filtration of the solutions with the addition of a filter-aid such as diatomaceous earth substituted. The filter-aids used for this purpose have to be sufficiently fine in structure that the interstices in the filter-cake are small enough to catch the finely dispersed suspended material in the sugar solution, and so yield a sparkling filtrate. The pressure filtration process does not remove as much of the impurities present as the defecation process. In industrial practice the used diatomaceous earth is either discarded or recovered by calcining, although Boeck and Thatcher propose to submit the cake from the filters to a differential settling from a water suspension (United States Patent Number 1,526,520—1925). The organic impurities derived from the sugar adhere to the diatoms and this fact interferes with recovery in this latter manner.

Pressure filtration may be applied to a defecated solution if a very porous diatomaceous filter-aid is added thereto. The flocs formed by the defecant are so much larger than sugar suspensoids that they are caught in interstices which would allow the suspensoids in an undefacated solution to pass. The impurities enmeshed in the flocs of the defecant do not become attached to the diatoms as in the case of ordinary pressure filtration and, therefore, the filter-aid may be recovered in a simple manner after the flocs have been dissolved.

One way of carrying out the present invention is to produce in the solution to be purified a flocculent precipitate which is soluble in dilute acid solutions. Tri-calcium phosphate and aluminium hydroxide are typical examples of such precipitates and they are produced in the solution in any well known manner. To this solution is added a quantity of prepared diatomaceous filter-aid having a very high porosity. The order of these steps is immaterial, that is, the filter-aid may be added before, after or at the same time as the flocculant. It is preferable to use an earth with a flow rate of from five to ten times as great as that of the earths normally used in sugar filtration. For example, the product known as Standard Super-cel may be taken as representative of a filter-aid suitable for simple pressure filtration of sugar liquors. A curve showing the flow-rate of this material is given on page 105 of a monograph entitled "Diatomaceous earth" written by Robert Calvert and published by the Chemical Catalogue Company, Inc., 419 Fourth Avenue, New York, in 1930. For the carrying out of this invention it is preferable to use a product with a flow rate of substantially ten times as great as that of Standard Super-cel. Dicalite 4200 grade may be taken as representative of such material. When the flocculant used is calcium phosphate, the amount of such filter-aid required is approximately five times the weight of the phosphate. The solution is filtered in the usual manner and the large flocs with the impurities embedded therein are readily held by the filter-aid, resulting in a clear filtrate. The filtration of this liquor is carried out as easily and expeditiously as with the non-defecated solutions using the standard filter-aid and the amount of the latter required is substantially the same in both cases.

When filtration is accomplished, the sugar solution retained in the filter-cake may be removed by displacement with water or the cake may be removed from the filter, mixed with water and refiltered, because so long as the flocs are preserved the impurities are bound therein and do not pass into the filtrates. The washed filter-cake containing diatomaceous earth and the flocs with the impurities therein is dispersed in a dilute acid solution which dissolves said flocs and liberates the enmeshed impurities. It is preferred to use sulphuric or muriatic acid diluted to about 2% and in such amount that the hydrogen-ion concentration of the suspension corresponds to a pH value of 1.5 to 2.0. The liberated impurities become dispersed throughout the acid solution and are readily separated from the heavier diatoms by sedimentation and lixiviation. The diatomaceous earth is withdrawn from the acid solution, washed acid free and it is then ready for re-use. The quality of this recovered filter-aid is substantially equal to new material but the amount may be less than the original amount introduced owing to some of the diatoms breaking down in handling and the debris so produced being washed away with the impurities removed from the sugar solution.

Owing to the ease and efficiency with which the filter-aid may be recovered for re-use, it becomes economical to use larger amounts of filter-aid than normally used in the filtration of sugar-solutions. The employment of these larger amounts increases the porosity of the filter-cake and consequently reduces the pressure required for filtration. Accordingly in a second way of carrying out of the invention the ratio of filter-aid to tri-calcium phosphate in the sugar solution is increased to approximately fifty to one and filtration accomplished on a continuous vacuum filter. The filter cake from this vacuum filtration is washed and the filter-aid recovered substantially as described above.

From the above it will readily be seen that a very efficient process has been provided for removing a high percentage of the impurities from sugar solutions, and in which the filter-aid used is efficiently recovered.

Various modifications may be made in this invention without departing from the spirit thereof or the scope of the claims and, therefore, the exact forms shown are to be taken as illustrative only and not in a limiting sense, and it is desired that only such limitations shall be placed thereon as are disclosed in the prior art or are set forth in the accompanying claims.

What I claim as my invention is:

1. A process for purifying sugar solutions which consists in producing in the solution a flocculent precipitate which is soluble in dilute acid solutions, impurities of the sugar solution being enmeshed in the flocs of the precipitate, adding a very porous diatomaceous filter-aid, filtering the solution, and recovering the filter-aid from the residue by dispersing it in acid to dissolve the flocculant, and removing the impurities from the relatively large pores of the filter-aid by washing.

2. A process for purifying sugar solutions which consists in producing in the solution a flocculent precipitate which is soluble in dilute acid solutions, impurities of the sugar solution being enmeshed in the flocs of the precipitate, adding a very porous diatomaceous filter-aid, filtering the solution, removing the adhering sugar solution from the filter-cake by means of washing, dispersing the washed cake in a dilute acid to dissolve the flocculant, and recovering the filter-aid from the acid solution by sedimentation.

3. A process for purifying sugar solutions which consists in forming a precipitate of calcium phosphate in the solution, adding a very porous diatomaceous filter-aid, filtering the solution, recovering the filter-aid by dispersing it in an acid solution to dissolve the calcium phosphate, and separating the filter-aid from the resultant suspension of impurities by sedimentation.

4. A process of purifying sugar solutions which consists in forming a precipitate of aluminum hydroxide in the solution, adding a very porous diatomaceous filter-aid, filtering the solution, recovering the filter-aid by dispersing it in an acid solution to dissolve the aluminum hydroxide, and separating the filter-aid from the resultant suspension of impurities by sedimentation.

ROBERT BOYD.